`US008181006B2`

United States Patent
Charles et al.

(10) Patent No.: US 8,181,006 B2
(45) Date of Patent: May 15, 2012

(54) METHOD AND DEVICE FOR SECURELY CONFIGURING A TERMINAL BY MEANS OF A STARTUP EXTERNAL DATA STORAGE DEVICE

(75) Inventors: Olivier Charles, Clamart (FR); Eric Leclercq, Brussels (BE); Matthieu Maupetit, Paris (FR)

(73) Assignee: France Telecom, Paris (FR)

( * ) Notice: Subject to any disclaimer, the term of this patent is extended or adjusted under 35 U.S.C. 154(b) by 699 days.

(21) Appl. No.: 12/300,666

(22) PCT Filed: May 14, 2007

(86) PCT No.: PCT/FR2007/051268
§ 371 (c)(1),
(2), (4) Date: Nov. 13, 2008

(87) PCT Pub. No.: WO2007/132122
PCT Pub. Date: Nov. 22, 2007

(65) Prior Publication Data
US 2009/0158026 A1 Jun. 18, 2009

(30) Foreign Application Priority Data
May 15, 2006 (FR) ...................................... 06 51733

(51) Int. Cl.
*G06F 9/00* (2006.01)
*G06F 17/30* (2006.01)
*H04L 9/32* (2006.01)

(52) U.S. Cl. ................................. 713/2; 713/176; 726/2

(58) Field of Classification Search ........................ 713/2
See application file for complete search history.

(56) References Cited

U.S. PATENT DOCUMENTS

| | | | | |
|---|---|---|---|---|
| 5,083,309 A | * | 1/1992 | Beysson | ........................... 705/55 |
| 5,159,182 A | * | 10/1992 | Eisele | ............................ 235/492 |
| 5,448,045 A | * | 9/1995 | Clark | ............................. 235/382 |
| 5,892,902 A | * | 4/1999 | Clark | ................................. 726/5 |
| 7,299,358 B2 | * | 11/2007 | Chateau et al. | ................ 713/176 |
| 7,539,868 B2 | * | 5/2009 | Balard et al. | ................... 713/176 |
| 2005/0138414 A1 | | 6/2005 | Zimmer et al. | |

FOREIGN PATENT DOCUMENTS

| | | |
|---|---|---|
| WO | WO 93/17388 A1 | 9/1993 |
| WO | WO 01/42889 A2 | 6/2001 |
| WO | WO 03/009115 A1 | 1/2003 |

* cited by examiner

*Primary Examiner* — Suresh Suryawanshi
(74) *Attorney, Agent, or Firm* — Drinker Biddle & Reath LLP (57) ABSTRACT

Method of configuring a terminal (10*a*) by means of a device external to said terminal (50*a*) able to communicate with said terminal and comprising data storage means, the initialization of said terminal triggering at least:
- a step for executing a boot program of an operating system of said terminal, said boot program being stored in a first memory area of said storage means,
- a step for verifying, by the boot program, a first digital signature of a first file stored in a second memory area of said storage means, said first file comprising a kernel of an operating system of said terminal,
- a step for starting up said kernel, said startup step being intended to be triggered only if said digital signature is valid.

10 Claims, 3 Drawing Sheets

METHOD AND DEVICE FOR SECURELY CONFIGURING A TERMINAL BY MEANS OF A STARTUP EXTERNAL DATA STORAGE DEVICE

CROSS-REFERENCE TO RELATED APPLICATIONS

This application is the U.S. national phase of the International Patent Application No. PCT/FR2007/051268 filed May 14, 2007, which claims the benefit of French Application No. 06 51733 filed May 15, 2006, the entire content of which is incorporated herein by reference.

FIELD OF THE INVENTION

The invention relates to the field of telecommunications and information technology. It more specifically relates to a method and a device for securely configuring a terminal by means of a startup data storage device.

BACKGROUND OF THE INVENTION

The invention described herein applies to the devices, generally removable, that can be used to store, and therefore transport, terminal startup and configuration data. These are, in particular, storage devices that are connected to a computer and that contain all the data needed for the startup and software configuration of the computer: operating system, user programs, user data, etc.

Such a storage device is, for example, a USB (Universal Serial Bus) key that can be connected to the USB port of a personal computer. In the memory of such a key, it is possible to store a complete operating system in a format such that, when the computer is restarted, it is this operating system that will be run. Consequently, when such a device is connected to a USB port of a personal computer and a user starts up this computer, the basic input/output system (BIOS) of the terminal detects the presence of such a device on the USB port and loads the programs that are stored therein, which in particular triggers the startup of the stored operating system.

In this startup procedure, only the software stored in the memory of the removable device is invoked, not the software initially installed on the hard disk of the computer. Such a device makes it possible to use any computer without using the programs that are stored on that computer's hard disk, and without having to fear the presence of any infected or corrupted programs.

However, given the security level expected of such removable devices, it is difficult to securely upgrade the content of the terminal's device. The user is therefore not able to have the software configuration used upgraded. Furthermore, such a removable device is likely to be hacked if it is stolen by a hacker and the software that is stored therein is modifiable.

Apart from reformatting the data storage device, there is no solution that allows both the secure configuration of the terminal from a tamper-proof startup data storage device and the secure updating of this configuration or of this device. The invention proposes a solution to this problem.

SUMMARY OF THE INVENTION

The subject of the invention is a method of configuring a terminal by means of a device external to said terminal able to communicate with said terminal and comprising data storage means, the initialization of said terminal triggering at least:

a step for running a boot program of an operating system of said terminal, said boot program being stored in a first memory area of said storage means, said first memory area featuring secure write-mode access, a step for starting up a kernel of an operating system from a first file, stored in a second memory area of said storage means, said startup step being intended to be triggered only if a digital signature of said first file is valid, a step for constructing, in RAM memory of said terminal, a first logical file structure from a second file, digitally encrypted and stored in a second memory area of said storage means, so as to enable the user to access data contained in said second file.

The method makes it possible to start up the terminal with the execution software environment of the operating system, in particular the kernel of the operating system, guaranteed safe and tamper-proof. This secure environment makes it possible to envisage an update process that is also secure.

The user's data, whether programs or data files, are made securely accessible, since the file tree structure is constructed in the environment of the securely loaded operating system. Furthermore, since this tree structure is constructed in random access memory, and therefore without interaction with the other storage media of the terminal such as hard disks, there can be no contamination of the data by a virus or another hacking program resident in the terminal.

According to another particular embodiment, the initialization of said terminal also triggers a step for constructing, in RAM memory of said terminal, a second logical file structure from data contained in a third file stored in a third memory area of said storage means, said construction step being intended to be triggered only if a digital signature of said second file is valid.

The user accesses the files stored in the third memory area through another logical structure, for example in tree form, constructed from a signed file. Thus, not only the user's data, but also the environment of the operating system, is made accessible to the user in a safe way.

According to a particular embodiment, a step for verifying the digital signature of the first file is executed by means of a digital signature verification datum stored in a memory area of said storage means whose write-mode access is secure. This guarantees that a hacker cannot tamper with the data stored in this secure area, since the memory area cannot be modified without an access authorization code.

According to a particular embodiment, the initialization of said terminal also triggers, a step for obtaining at least one fourth data file, said fourth file being digitally encrypted, a step for constructing, in random access memory of said terminal, a third logical file structure from data contained in said at least one fourth file.

The fourth file enables the configuration of the terminal to be updated incrementally.

This file can be obtained in different ways. According to a first alternative, the fourth file is obtained by reading a fourth memory area of said storage means. According to a second alternative, the fourth file is obtained by downloading from a data server having a communication link with said terminal.

Preferably, at least one of the construction steps is executed conditionally on the provision of a valid datum authenticating a user. Thus, only a user who has a valid authentication datum can access the files of this second logical structure.

According to this principle, a user can access only the data of the files for which he has a valid authentication datum. The data stored in the various files present in the storage means can thus be made selectively accessible to different users depending on the file concerned, whereas the data for starting up the operating system can be made accessible to all the users since no authentication datum is required for this.

The various logical file structures constructed from the various files are preferably seen by the user in the form of a single logical structure, in which the user will be able to navigate as if it were a partition on a hard disk.

According to a particular embodiment, the initialization of said terminal also triggers a step for decrypting at least one data block of said second respectively fourth file, said decryption step being executed following a request for read-mode access to a file of said first respectively third logical structure, the decryption key used in the decryption step being obtained conditionally on the provision of a valid datum authenticating a user. The write-mode access to the data structure is therefore secure: only an accredited user can modify the data structure. Since this data structure is integral by construction, it remains integral following the modifications.

Correlatively, another subject of the invention is a device for configuring a terminal, the device being external to said terminal, able to communicate with said terminal and comprising data storage means, said storage means comprising:
- a first memory area, with secure write-mode access, comprising a boot program for an operating system of said terminal,
- a second memory area comprising a first digitally-signed file, said first file comprising a kernel of an operating system of said terminal,
- a third memory area comprising at least one second digitally-encrypted file,
- an initialization of said terminal triggering,
- a step for executing said boot program,
- a step for starting up said kernel, said startup step being intended to be triggered only if a digital signature of said first file is valid,
- a step for constructing, in RAM memory of said terminal, a first logical file structure from said second file, so as to enable a user to access data contained in said second file.

The stated advantages of the inventive method can be transposed to the inventive device and to its various embodiments.

BRIEF DESCRIPTION OF THE DRAWINGS

Other aims, characteristics and advantages of the invention will become apparent from the following description, given purely as a nonlimiting example, and with reference to the appended drawings in which.

DETAILED DESCRIPTION OF THE INVENTION

Figure 1A:
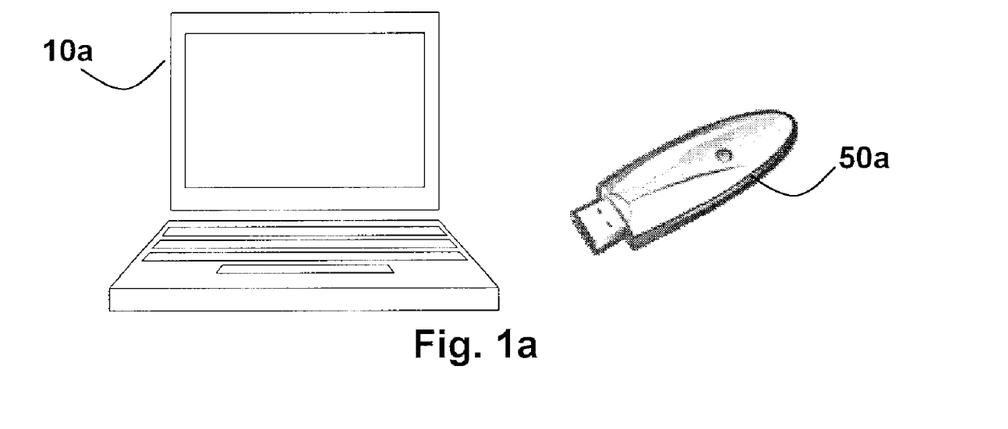
FIG. 1a represents a first embodiment of a system incorporating the inventive device and enabling a terminal to be configured.

FIG. 1a illustrates a first embodiment of a system incorporating the inventive device and enabling a terminal to be configured. The system represented in FIG. 1a comprises:
- a terminal 10a;
- a USB key 50a comprising data storage means in the form of memory and, optionally, a chip card.

The terminal 10a is typically a personal computer, having at least one central data processing unit, a keyboard, a screen, and a communication bus for interconnecting peripheral devices to the central processing unit, for example a serial bus compliant with the USB (Universal Serial Bus) standard. It is not essential for the terminal to have a hard disk, in as much as the latter is not used to implement the invention. The terminal 10a also comprises at least one USB port for connecting the USB key.

The terminal 10a also comprises a memory in which is stored the BIOS (Basic Input/Output System) program, a low-level program for detecting, when the terminal 10 is started up, peripheral devices connected to the terminal 10, and the starting up of the operating system.

Figure 1B:
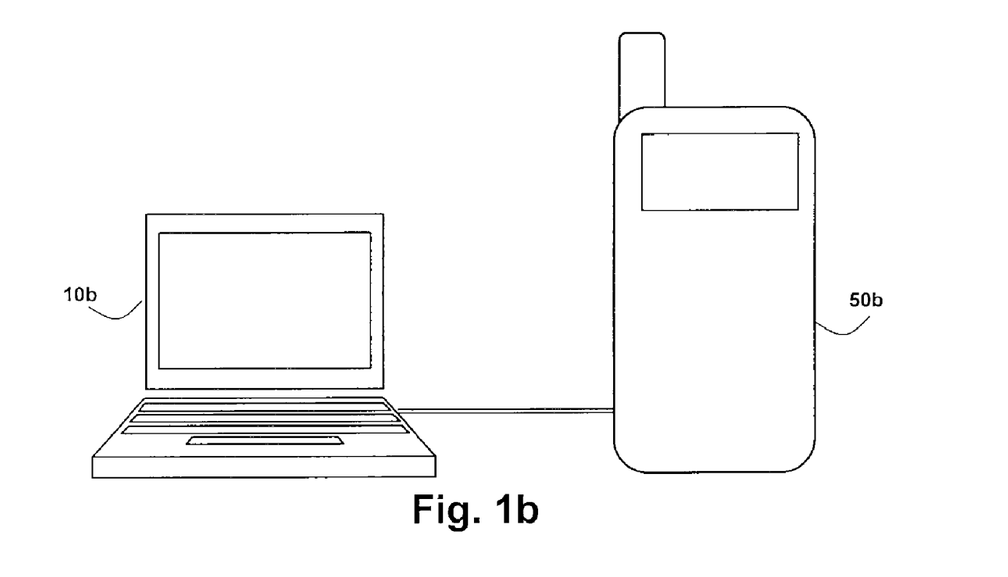
FIG. 1b represents a second embodiment of a system incorporating the inventive device and enabling a terminal to be configured.

FIG. 1b illustrates a second embodiment of a system incorporating the inventive device and enabling a terminal to be configured. The device represented in FIG. 1b comprises:
- a terminal 10b;
- a telecommunication terminal 50b comprising a chip card and data storage means in the form of memory.

The terminal 10b is identical to the terminal 10a described for FIG. 1. The terminal 50b has a USB port enabling a communication link to be set up with the terminal 10b. This terminal 50b is implemented, for example, in the form of a cell phone or a personal digital assistant (PDA).

By connecting the cell phone 50b to the terminal 10b via a USB cable, three peripheral modules are then accessible to the terminal 10 via the same USB port:
- the memory of the terminal 50b, seen as a conventional USB key memory,
- the network access module of the terminal 50b, which is in fact the modem for accessing the cell phone network,
- a chip card of the terminal 50b, which is in fact the SIM (Subscriber Identity Module) card of the network access module.

In this second embodiment, the cell phone 50b is seen by the terminal 10 either as a network card, or as a modem. Regarding the use of the SIM card of the network access module as chip card, a virtual driver as described in the patent document published under the number WO 2005/036822 is preferably used for the terminal 10b. Such a driver can be used equally with a wired link and with an unwired link between the terminal 10b and the terminal 50b. This way, the terminal can access the SIM card as if it were a chip card inserted into a local chip card reader, and therefore disregarding the USB link and the access constraints associated with the integration of the SIM card into the cell phone's environment.

According to the same principle, a virtual driver can be used also to drive the network access module, so that the network access programs operate in the same way as if the network access module were a module installed locally in the terminal 10b.

The next part of the description refers equally to the first embodiment and to the second embodiment.

The USB key 58 or the telecommunication terminal 50b each constitutes a mobile and removable device, comprising data storage means.

The removable storage devices usually used to start up and configure terminals (startup hard disk, etc.) comprise a storage memory usually divided into two areas: a system area and a user area.

The system area comprises a file which contains an image of the operating system. It also contains, in its initial bytes, a boot program (or "bootstrap" according to English terminology), triggered by the BIOS and responsible for starting up the operating system.

The user area hosts the user's personal files: configuration files, working documents, etc.

The invention relies on a new way of subdividing the memory used to configure a terminal.

Figure 2A:
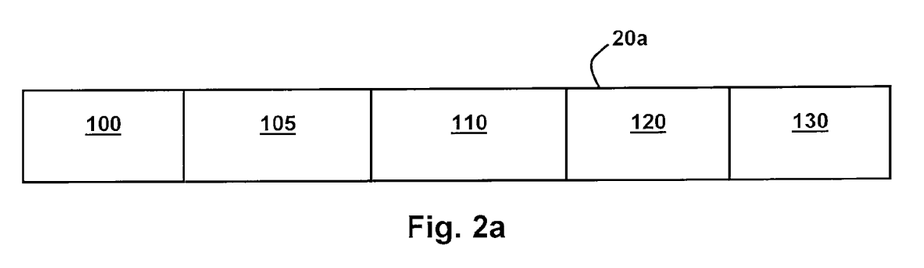
FIG. 2a diagrammatically represents a first configuration of a memory used in the invention.

FIG. 2a illustrates an embodiment of an inventive memory 20a. This memory is divided into five data areas 100, 105, 110, 120, 130. As a set, these areas correspond to a partition of the memory 20a.

The first area 100 is called startup area. This memory area contains a boot program, designed to trigger the loading of a kernel of an operating system of the terminal 10a, 10b, this kernel being stored in area 105.

The second area 105 of the memory 20a is called "kernel area". This area comprises a single, signed file F105, comprising in particular the data and programs needed to start up the operating system of the terminal 10a and to read and operate the data stored in the areas 110, 120 and 130 of the memory. The file F105 comprises:
- the kernel of an operating system of the terminal 10a;
- a data management driver designed to construct the file system which will enable the user to access data stored in the areas 110, 120 and 130 of the memory 20a;
- a peripheral driver making it possible to enter a password on a keyboard or enter a biometric datum authenticating a user of the terminal 10a.

A digital signature of the file F105 is stored in the memory 20a so as to enable the integrity of the file F105 to be verified. This signature is stored in the memory area 105, for example in a header area of this area, so as to be easily accessible.

The third area 110 of the memory 20a is called system area. This area of the memory comprises basic data and/or programs complementing those of the kernel area and useful to the operation and use of the terminal 10a, 10b. It concerns, for example, the following elements: peripheral drivers other than those of the kernel area, configuration programs, operating system administration tools, and so on. All of the data and/or files of the system area 110 are stored in the form of a single, signed and preferably compressed file F110. A digital signature of this file F110 is stored in the memory 20a so as to enable the integrity of the file F110 to be verified. This signature is stored in the system area 110, for example in a header area of this area, so as to be easily accessible.

The fourth area 120 is called delta area. This area of the memory comprises programs and data complementing those of the system area 110, for example programs, files or configuration data that are specific to the user and that correspond to an update of the system area by addition. As long as there is no update of the system area 110 by the addition of programs or other files, this memory area comprises no data but is nevertheless present on the peripheral device 20a. All of the data and/or files of the delta area 120 are stored in the form of a single, encrypted and preferably compressed file F120.

The fifth area 130 is called user area. This area of the memory comprises files that are personal to the user: personal configuration files and/or data, working documents, etc. All of the data and/or files of the user area 130 are stored in the form of a single, encrypted and preferably compressed file F130.

The part of the memory 20a corresponding to the startup area 100 is accessible in secure write mode. According to a first alternative, this memory is implemented in the form of a read-only memory (ROM) so as to make it impossible to modify the data stored therein. According to a second alternative, write-mode access to this part 100 of the memory is possible, but not without an access code. In this second alternative, a memory coupled to a chip card for example is used, for example the memory of a USB key comprising a chip card.

The part of the memory 20a corresponding to the kernel and system areas 105 and 110 is preferably a read only part.

The part of the memory 20a corresponding to the delta and user areas 120 and 130 is rewritable, implemented, for example, in the form of a flash type memory. This part of the memory is therefore accessible in read and write modes. Additionally, as will be described hereinbelow, different digital signing and data encryption mechanisms are used to guarantee the integrity of the data stored therein.

In the case where an asymmetrical cryptography technique is used to generate the signatures of the files F105 and F110, a digital signature verification datum, for example a certificate or a public key, necessary for the verification of these signatures, is stored in the secure part of the memory 20a, that is, in a startup area 100, so as to be unmodifiable by the user or only by an unauthorized person. With this hypothesis, only an accredited person, having the corresponding private key, is capable of generating the signatures of the files F105 and F110.

Figure 2B:
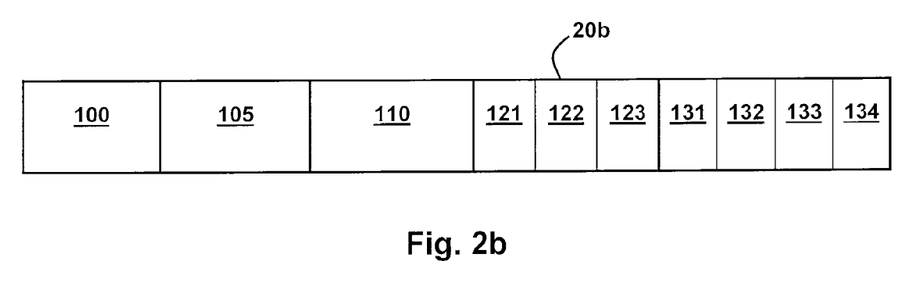
FIG. 2b diagrammatically represents a second configuration of a memory used in the invention.

FIG. 2a illustrates another embodiment of the memory used in the invention. In this embodiment, the memory 20b is also divided into five data areas, where the areas 100, 105 and 110 are identical to the areas described for FIG. 2a. However, in the embodiment illustrated in FIG. 2a, the delta area 120 and the user area 130 are divided into subparts 121 to 123, respectively 131 to 134, each part comprising an encrypted file F121 to F123, respectively F131 to F134. In effect, the update data and/or program of the system area and/or the user's data and/or programs can be composed of several subparts, each part being compressed, encrypted and stored in the form of a single file.

By generalizing the embodiments of FIGS. 2a and 2b, the delta area 120 and the user area 130 each comprise one or more data files.

Figure 4:
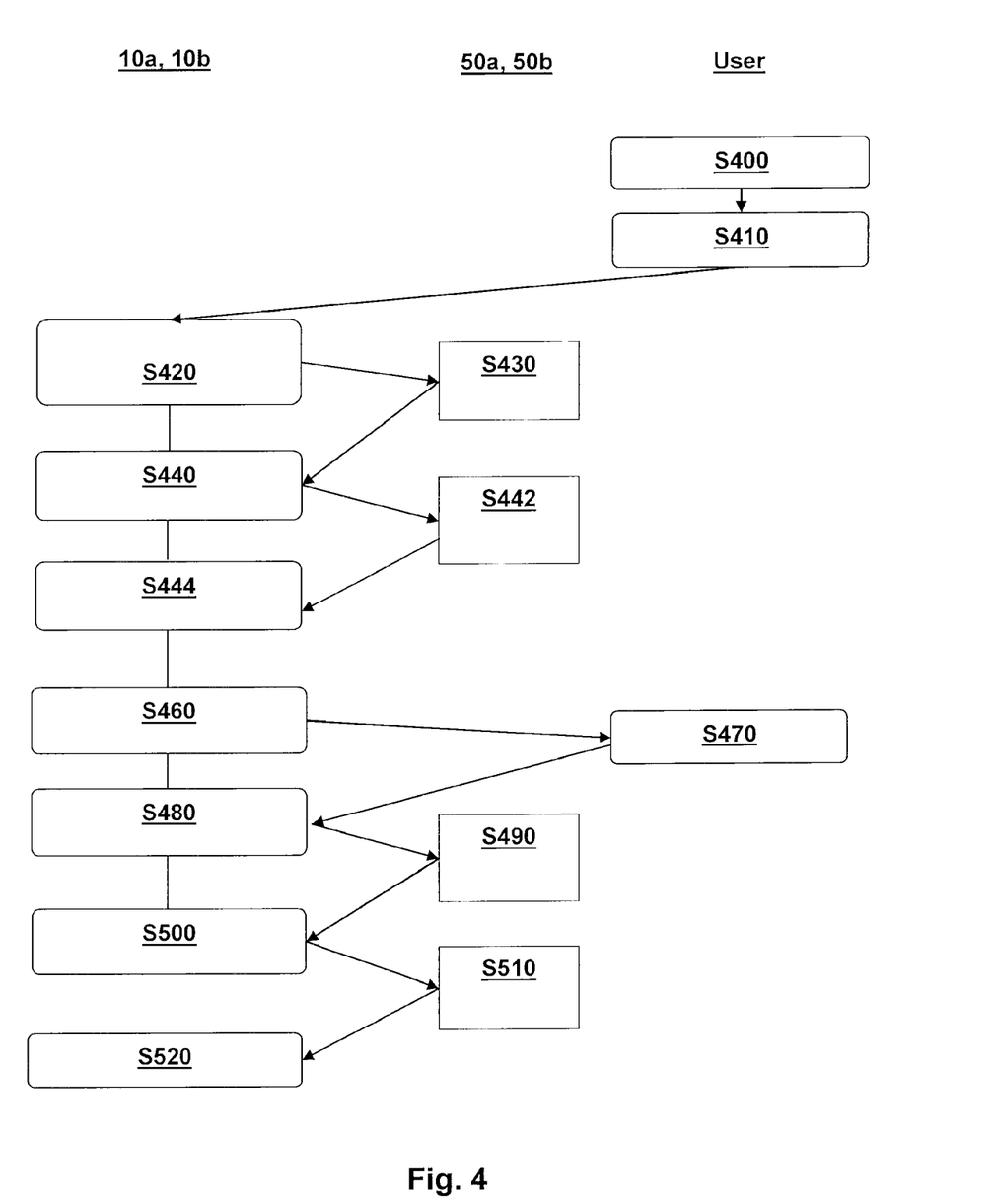
FIG. 4 represents a flow diagram of the method of configuring a terminal from a storage device.

FIG. 4 illustrates how the content of the memory 20a or 20b is operated when the host terminal is started up, when the startup and configuration process is run for the terminal 10a or 10b with a communication link to a peripheral device (USB key 50a or terminal 50b) used as storage device.

In the step S400, a user of the host terminal connects his peripheral device 50a, 50b to one of the USB ports of the host computer.

In the step S410, the user powers up and starts up the terminal 10a, 10b.

In the step S420, the basic input/output program (BIOS) starts up. This BIOS program executes a procedure for detecting peripheral devices present on the terminal 10a, 10b or interconnected to this terminal. It searches, in a predetermined order, through a predefined configurable list which is specific to it, among the data storage media that are present, for the first medium comprising a boot sector comprising a boot program for the operating system. Traditionally, the standard configuration of the startup lists indicates that the peripheral devices connected to the USB bus must be interrogated before the terminal's hard disk. Consequently, in the invention, it is the startup area 110 of the memory of the USB key that is detected first and used in priority over any hard disks that may be present in the terminal 10a, 10b.

In the step S430, the memory responds to the presence detection. The BIOS program therefore detects the presence of a storage memory 20a, 20b on the USB peripheral device 50a, 50b. The BIOS program accesses the memory in read mode then triggers the execution of a boot program stored in the system area 110 of the memory.

In the step S440, the boot program is executed.

In the step S441, the boot program accesses the kernel area 105 of the memory 20a, 20b in read mode.

In the step S444, this program verifies the signature of the file F105 which is stored in the kernel area 105 by means of a public key or a certificate, preferably stored in the secure area of the memory, the startup area 100. In the case where the signature is not valid, the procedure is terminated. If the signature is valid, the kernel is loaded into memory of the terminal 10a, 10b and executed.

In the step S450, the kernel accesses the system area 110 of the memory 20a, 20b in read mode.

In the step S460, the kernel verifies the signature of the file F110 which is stored in the system area 110 by means of a public key or a certificate, preferably stored in the secure area of the memory, the startup area 100. In the case where the signature is not valid, the procedure is terminated. The kernel then decompresses the file F110.

The kernel also starts up the data management driver. This driver then constructs, in RAM memory of the terminal, a logical file structure, in the form of a tree of directories and files, from the data in the decompressed file F110 obtained from the system area 110, in order to make only the files of this tree accessible in read mode by a user of the terminal.

In the step S460, the operating system triggers the execution of an authentication software module designed to prompt the user to enter a password on the keyboard of the terminal 10a or 10b, or of the peripheral device 50b.

In the step S470, the user enters a password on the keyboard of the terminal 10a, 10b or of the peripheral device 50a, 50b, a password that is then analyzed by the authentication module to authenticate the user of the terminal 10a, 10b.

The steps S460 and S470 can, if necessary, involve a chip card and the peripheral device driver needed to operate this chip card.

If authentication fails (wrong password), the procedure is stopped, unless the user is authorized to perform several input attempts. Preferably, if authentication fails, the complete startup of the operating system of the terminal 10a, 10b is stopped, so that the unauthenticated user is not able to use this terminal. As an alternative, the operating system starts up fully but the data and/or files in the delta and user areas are neither extracted nor accessible by this user, the latter nevertheless being able to use the terminal 10a, 10b with a raw operating system, without other data, files or programs.

In the step S480, if authentication succeeds, the data management driver obtains a key for decrypting the data in the delta area 120. This decryption key is obtained either by interrogation of the chip card subject to the presentation of a valid password, or by decryption, by means of the password supplied, of an encrypted decryption key stored in the delta area 120.

The password supplied by the user can also be used as a key for decrypting or encrypting the data in the delta and user areas. If the encryption or decryption keys stored in the chip card are used, the entered password not being used as decryption key, it can be replaced by a simple PIN code.

In the step S490, following a request to access the delta area 120 of the memory 20a or 20b, the data management driver obtains, subject to their existence, the file or files F120 to F124 stored in delta area 120 then decrypts the file or files in this area. If no file is stored in delta area 120, the procedure continues to the step S510.

In the step S500, the data management driver constructs, in RAM memory of the terminal 10a, 10b, a logical file structure, in the form of a tree of directories and files, from the data contained in the decrypted file or files F120 to F124 in the delta area 120. The files of this tree structure are thus accessible by a user of said terminal through this logical structure. In other words, this new tree structure complements and is added to that constructed previously from the file F110, to form a single tree structure, accessible by the user like a hard disk partition.

In the step S510, following a request to access the user area 130 of the memory 20a, 20b, the data management driver obtains, subject to their existence, the file or files F130 to F134 stored in user area 130 then decrypts the file or files in this area. If no file is stored in user area 130, the procedure is terminated.

In the step S520, the data management driver constructs, in RAM memory of the terminal 10a, 10b, a logical file structure, in the form of a tree of directories and files, from the data contained in the decrypted file or files F130 to F134 in the user area 130. The files of this tree structure are thus accessible by a user of the terminal 10a, 10b by means of the same logical structure as the data obtained from the file F110 and that obtained from the file F120. In other words, this third tree structure complements and is added to that constructed previously to form a single tree structure, accessible by the user as a hard disk partition.

When the user requests write-mode access, respectively read-mode access, to one of the files of the constructed tree structure, the data management driver is responsible for encrypting, respectively decrypting, the corresponding blocks of the memory 20a, 20b.

The encoding of a file tree structure complies with a quite specific structure and requires the use of predetermined specific parameters. Consequently, the decrypting of such a logical structure executed with a wrong decryption key renders the data obtained unusable. For each of the signed files F120 to F124 or F130 to F134, the encryption therefore serves as an integrity check and the encrypted file serves as a signature.

Regarding the data encryption, asymmetrical cryptography functions are, for example, used. Advantageously, the data files F120 to F124 and F130 to F134 stored in the delta and user areas are encrypted, respectively decrypted, block by block. In this case, several encryption keys and therefore as many encryption keys are used, and not just one key. A rule specifies which key is used for a given block. For example, when there are Z memory blocks to be encrypted or decrypted, the rule defines that a block x, $0 \leq x < Z$, will be encrypted, respectively decrypted, by means of the encryption key $KC_i$, respectively decryption key $KD_i$, such that x is congruent with i modulo N, where N is the number of encryption keys.

Thus, when the data management driver constructs, from system, delta or user areas of the memory 20a, 20b, a tree structure of directories and files, it makes the data stored in these areas transparently accessible by a user. These areas are thus seen as a single virtual storage peripheral device. The expression virtual storage partition is also used. The logical organization of this file system, in particular the tree structure of the files stored in these, is visible to the user. Following a request for read-mode access (respectively write-mode access) to a data file of this tree structure, the data management driver decrypts (respectively encrypts) on the fly the data block or blocks comprising this file by using the corresponding decryption (respectively encryption) key or keys.

For security reasons, only the data files stored in the delta and user areas can be modified. Regarding the delta area, only a specific program, called update installation program, present in the system area, is allowed to write in the delta area.

The user himself can modify only the files stored in the user area. In other words, when the user sends a request to write data, the data management driver first checks that it is a file in the user area. If not, the write operation is rejected. Otherwise, the data in the file is stored on the fly on the peripheral device 20*a*, 20*b* in the user area.

In other words, for each file accessible through the logical tree structure, the data management driver has information indicating the area (system, delta or user) in which the file concerned is physically stored.

Advantageously, no memory swap process will be used. The absence of swap guarantees that the decrypted file will never be present on any disk, or even on any other medium, which reinforces the security of the device. In this way, no trace is left on the hard disk of the terminal 10*a*, 10*b* when it is occasionally used and started up by a roaming user.

The secure startup procedure that has been described guarantees that the execution of the operating system takes place in a controlled environment, and therefore a trusted environment. In effect, the startup area 110 is an area that cannot be modified by an unauthorized user.

The hard disk of the terminal 10*a*, 10*b* is never invoked, nor is any other storage medium of the terminal other than the RAM memory and the processor of the terminal 10*a*, 10*b*. Furthermore, the user does not leave any personal data thereon. Also, the user cannot execute the programs resident on the hard disk of the machine, in particular viruses or malware. As a general rule, only the data and programs present in the memory of the key 50*a* can be used or executed.

The presence of a chip card (chip card of the USB key 50*a* or SIM card of the terminal 50*b*) makes it possible to securely store decryption and/or encryption keys that are far longer than a simple password, and therefore enhances the security level of the device. Furthermore, the chip card greatly enhances the ergonomics of the device by limiting the input by the user to a short identification code (normally 4 digits), before authorizing access to the card's private data. Finally, a chip card is blocked after three unsuccessful attempts to input a code, which provides a way of preventing attacks by exhaustive tests.

Moreover, the chip card can also be used for the decryption of the data in the delta and user areas, instead of the data management driver.

As an alternative to the use of a password or a PIN (personal identification number) code, biometry techniques can also be used, provided that the device incorporates an appropriate biometric sensor. In such an alternative, the user, instead of entering his PIN code or his password, is required to apply his finger to the location provided, for example on the USB key. By generalizing, any authentication datum of the user can be used instead of a simple password.

Since the delta area 120 is encrypted, the data that it contains can be accessed only following the provision of a valid password, so a computer hacker having taken possession of the USB key without knowing the associated password and with the terminal not yet started up can neither modify the system area 110 because the signature of the latter is verified on startup, nor inject files into the delta area 120 or user area because a wrong password will not allow the data in this area to be decrypted correctly. The encryption mechanism used therefore makes it possible to guarantee the integrity of this data.

In the embodiment of FIG. 1*b*, the startup area 100 is included in the SIM card of the radio modem of the terminal 50*b*. The startup area 100 is therefore accessible in read mode only from the USB bus of the terminal 10*b* when the terminal 50*b* is linked by USB cable to the terminal 10*b*. However, in this embodiment, the startup area 100 is also accessible in write mode for the mobile operator of the telecommunication network which the terminal 50*b* accesses, for example by sending a specific short message (short message service or SMS). This technique for accessing the data of a SIM card in write mode by an operator is better known by the English expression "over the air" or OTA.

This embodiment prevents any fraud or hacking on the terminal 50*b* while enabling the operator to update the startup area 100 by a trusted channel via the telecommunication network. The update of the startup area 100 can relate to all the area or only to the signature verification keys.

Figure 3:
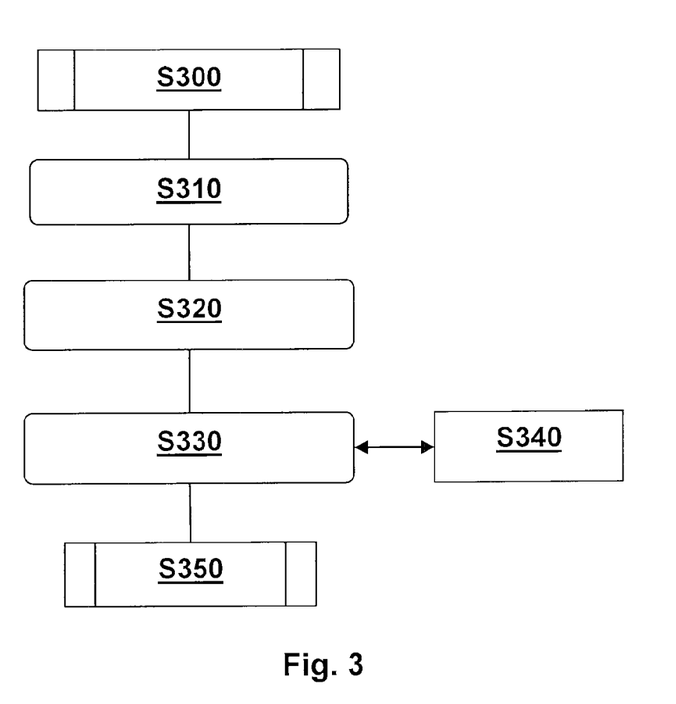
FIG. 3 represents a flow diagram of a method of updating the configuration of a terminal and of a storage device.

A process for updating the data of the USB key will now be described in relation to FIG. 3. This process can be used when the terminal 10*a* or 10*b* has been configured on startup in the step S300 by the inventive secure configuration method.

In a first embodiment, the terminal 10*a*, 10*b* has a communication module for accessing a communication network. The system area 110 comprises a communication module driver adapted to drive the communication module, this driver being started up by the operating system following the detection on the terminal of the communication module.

In a second embodiment, when the terminal 10*b* does not have such a communication module, the process uses the communication module of an external terminal, for example the telecommunication terminal 50*b*, linked to the terminal 10*b* by a wired or unwired communication link set up on one of the communication ports of the terminal 10*b*. In this case, the file F110 of the system area 110 comprises a driver adapted to drive the communication module via said link, this driver being automatically started up in the process by the operating system, for example when the latter detects the presence of the module on one of the communication ports. One embodiment of such driving is described for example in the patent document published under the number WO 2005/036822.

In a third embodiment, a data storage medium is connected to the terminal 10*a*, 10*b* via a communication port of this terminal.

In the first or second embodiment, a communication link is set up in the step S310 by means of a communication module between the terminal 10*a*, 10*b* and a remote server via a communication network. One or more data files F125, F126, etc., encrypted and digitally signed and preferably compressed, are then downloaded from this server. These files F125, F126 are, for example, files in the "rpm" format (format available under the Linux operating system).

In the third embodiment, the file or files F125, F126 for updating the delta area 120 are obtained in the step S310 by simply reading the data storage medium connected to the terminal 10*a*, 10*b*.

Following the receipt of such a data file F125, F126, the data management driver, started up by the kernel of the operating system, verifies, in the step S320, the signature of this file for example using a public key stored in the system area 110. If the signature is not valid, the file is not taken into account and the update procedure is terminated.

In the step S330, if the signature is valid, the update installation program, present in the system area, proceeds to install the data and/or programs contained in this file F125, F126 in the delta area. The tree structure of directories and/or files constructed in RAM memory of the terminal 10*a*, 10*b* is thus complemented with the data deriving from the installation of the file F125, F126.

In the step S350, the configuration of the terminal is updated and the user of the terminal can execute all the usual operations on the resulting tree structure.

All the additions of programs and/or associated data are thus performed via the delta area 120.

The inventive device thus presents the user with a unified view of the system and delta areas: physically, these areas each contain the description of a file tree structure and the corresponding files. Ultimately, it is a single tree structure resulting from the superimposition of these tree structures that is presented to the user.

When the update is performed through the communication module of an external telecommunication terminal 50*b*, the updating of the USB key used as storage medium can easily be controlled by the operator of the telecommunication network that the terminal 50*b* accesses.

The updating of the USB key is done by installing files, each seen as a single packet of data, in the delta area 120. Since this operation is performed by the operating system which is guaranteed safe thanks to the implementation of a protected startup process and the verification of the signature of the system area 110, the delta area 120 remains safe. In effect, a mechanism controlling access to the tree structure of the file system ensures that only the update installation program has permission to write in the delta area 120. The user of the USB key does not have the necessary privileges to write an arbitrary file outside his user area 130.

When the user asks to stop the terminal 10*a*, 10*b*, all the modifications not yet registered are written on the fly, in the delta and user areas in such a way that the modifications made by the user are available when the terminal 10*a*, 10*b* is next started up.

In the update process, the system area 110 is never altered. This part therefore preferably corresponds only to the basic data and program needed to operate the terminal (kernel of the operating system and associated basic elements). The data obtained from the delta area 120 are compatible with these basic data. Most of the time, a change of the kernel of the operating system contained in the system area 110 will have repercussions on the data of the delta area 120. It will therefore be understood that the solution proposed here allows for a simplified update, by addition, and not a full update. Only a relatively minimal quantity of data is therefore to be transmitted via the network for this update, compared to the hundreds of megabytes needed for a full update of the system and delta areas.

Furthermore, because of the installation process which allows only signed files to be processed, the operator of the telecommunication network can manage and control the updates that the users make, allowing, for example, only the installation of predefined files or programs. This guarantees that the system area 110, by taking account of the modifications stored in the delta area 120, contains only software validated by the operator.

As an alternative to the use of a USB key, notably in the case of a personal computer 10*a*, 10*b* that is relatively old and which cannot start up on the USB port, it is possible to use a CD-ROM for the first phase for configuring and starting up the operating system (step for loading data in the areas 100, 105 and even 110, then, once the operating system has started up and the USB peripheral devices are accessible, searching for the user data on another storage medium.

Generally, to increase the storage capacity, two different storage media can be used: 1 (for example the USB key 50*a*) for the startup area 100, the kernel area 105, even the system area 110, the other (for example the memory of the USB key 50*a* or that of the peripheral terminal 50*b*) for the other areas, in particular the delta area 120 and the user area 130. At least a part of the data storage means is interrogated by a basic input/output system in a phase for searching for a boot program of an operating system of the terminal 10*a*, 10*b*. In the event, in the example given, it is the first of the two media, accessible by the BIOS and detected as being part of the list of media, that the BIOS analyzes to detect therein the presence of a boot program. This first medium needs only to be accessible in read only mode. The second of these two media is accessible in read and write modes from the terminal 10*a* or 10*b*, by means of a storage peripheral device management driver and via a communication link between the terminal 10*a*, 10*b* and this storage medium.

The process for configuring the terminal 10*a*, 10*b* according to the invention is entirely automated. The only times when the user intervenes are when entering a password, or, optionally, to run a program for connecting to the update loading server. With the invention, it therefore becomes extremely simple for a roaming user to configure any personal computer and update this configuration, or more simply, in order to work in a predefined software environment and with data that is specific to him. The integrity of the user's software environment and data is guaranteed. From the point of view of the operator, a control of the programs installed on the terminal is possible simply and effectively.

The invention claimed is:

1. A method of configuring a terminal by means of a device external to said terminal able to communicate with said terminal and comprising data storage means, the initialization of said terminal triggering at least:
   a step of running a boot program of an operating system of said terminal, said boot program being stored in a first memory area of said storage means, said first memory area featuring secure write-mode access,
   a step of starting up a kernel of an operating system from a first file, stored in a second memory area of said storage means, said startup step being intended to be triggered only if a digital signature of said first file is valid, and
   a step of constructing, in RAM memory of said terminal, a first logical file structure from a second file, digitally encrypted and stored in a second memory area of said storage means, so as to enable the user to access data contained in said second file.

2. The configuration method as claimed in claim 1, in which the initialization of said terminal also triggers,
   a step of constructing, in RAM memory of said terminal, a second logical file structure from data contained in a third file stored in a third memory area of said storage means, said construction step being intended to be triggered only if a digital signature of said second file is valid.

3. The configuration method as claimed in claim 1, in which a step of verifying the digital signature of the first file is executed by means of a digital signature verification datum contained in a memory area of said storage means whose write-mode access is secure.

4. The configuration method as claimed in claim 1, in which the initialization of said terminal also triggers:
   a step of obtaining at least one fourth data file, said fourth file being digitally encrypted, and
   a step of constructing, in random access memory of said terminal, a third logical file structure from data contained in said at least one fourth file.

5. The configuration method as claimed in claim 1, in which at least one of the construction steps is executed conditionally on the provision of a valid datum authenticating a user.

6. The configuration method as claimed in claim 4, in which the fourth file is obtained by reading a fourth memory area of said storage means.

7. The configuration method as claimed in claim 4, in which the fourth file is obtained by downloading from a data server having a communication link with said terminal.

8. The configuration method as claimed in claim 1, in which the initialization of said terminal also triggers a step of decrypting at least one data block of said second file, said decryption step being executed following a request for read-mode access to a file of said first logical structure, the decryption key used in the decryption step being obtained conditionally on the provision of a valid datum authenticating a user.

9. A device for configuring a terminal, the device being external to said terminal, able to communicate with said terminal and comprising data storage means, said storage means comprising:

a first memory area, with secure write-mode access, comprising a boot program for an operating system of said terminal, a second memory area comprising a first digitally-signed file, said first file comprising a kernel of an operating system of said terminal, and a third memory area comprising at least one second digitally-encrypted file, an initialization of said terminal triggering at least:

a step of executing said boot program, a step of starting up said kernel, said startup step being intended to be triggered only if a digital signature of said first file is valid, and a step of constructing, in RAM memory of said terminal, a first logical file structure from said second file, so as to enable a user to access data contained in said second file.

10. The device as claimed in claim 9, in the form of a USB key.

* * * * *